(12) United States Patent
Schiffman et al.

(10) Patent No.: US 10,771,444 B2
(45) Date of Patent: Sep. 8, 2020

(54) DISTRIBUTED AUTHENTICATION

(71) Applicant: Hewlett-Packard Development Company, L.P., Spring, TX (US)

(72) Inventors: Joshua Serratelli Schiffman, Bristol (GB); Gurchetan Grewal, Bristol (GB); Thalia Laing, Bristol (GB); Boris Balacheff, Boulogne-Billancourt (FR)

(73) Assignee: Hewlett-Packard Development Company, L.P., Spring, TX (US)

(*) Notice: Subject to any disclaimer, the term of this patent is extended or adjusted under 35 U.S.C. 154(b) by 225 days.

(21) Appl. No.: 15/947,299

(22) Filed: Apr. 6, 2018

(65) Prior Publication Data
US 2018/0278594 A1 Sep. 27, 2018

(30) Foreign Application Priority Data
Mar. 24, 2017 (EP) .................................... 17305335

(51) Int. Cl.
*H04L 29/06* (2006.01)
*H04L 9/08* (2006.01)
*H04L 9/32* (2006.01)

(52) U.S. Cl.
CPC ............ *H04L 63/062* (2013.01); *H04L 9/085* (2013.01); *H04L 9/0861* (2013.01);
(Continued)

(58) Field of Classification Search
CPC ..... H04L 63/062; H04L 9/085; H04L 9/0861; H04L 9/0891; H04L 9/3255; H04L 9/3271; H04L 63/0853; H04L 63/104
See application file for complete search history.

(56) References Cited

U.S. PATENT DOCUMENTS 5,825,880 A    10/1998  Sudia et al.
7,194,628 B1 *  3/2007  Guthery ................. H04L 9/085
                                                   713/168

(Continued)

FOREIGN PATENT DOCUMENTS

WO    WO-2007102907        9/2007
WO    WO2016049406 A1      3/2016

OTHER PUBLICATIONS

Cetin, C., Design, Testing and Implementation of a New Authentication Method Using Multiple Devices, Jan. 2015, <http://scholarcommons.usf.edu/cgi/viewcontent.cai?article-6858&content-etd>.

(Continued)

*Primary Examiner* — Ghodrat Jamshidi
(74) *Attorney, Agent, or Firm* — HP Inc. Patent Department

(57) ABSTRACT

Examples associated with distributed authentication are described. One example includes generating a paired public key and private key associated with a user. The private key is split into a set of shares, which are distributed to a set of devices associated with the user. A challenge is generated to authenticate the user to grant the user access to a resource upon receiving an authenticating response to the challenge. The challenge is distributed to members of the set of devices. Partial responses are received from members of the set of devices and combined into a group signature. The group signature serves as an authenticating response to the challenge when generated from partial responses received from a threshold number of members of the set of devices.

13 Claims, 5 Drawing Sheets

(52) U.S. Cl.
CPC .......... *H04L 9/0891* (2013.01); *H04L 9/3255* (2013.01); *H04L 9/3271* (2013.01); *H04L 63/0853* (2013.01); *H04L 63/104* (2013.01)

(56) References Cited

U.S. PATENT DOCUMENTS

| | | | |
|---|---|---|---|
| 7,343,014 B2 | 3/2008 | Sovio et al. | |
| 8,259,947 B2* | 9/2012 | Rose | H04L 9/3247 |
| | | | 380/277 |
| 8,434,133 B2 | 4/2013 | Kulkarni et al. | |
| 8,977,847 B1* | 3/2015 | Juels | H04L 9/3271 |
| | | | 713/162 |
| 9,298,901 B1 | 3/2016 | Boss et al. | |
| 9,380,058 B1 | 6/2016 | Ligatti et al. | |
| 9,641,341 B2* | 5/2017 | Oberheide | H04L 9/3226 |
| 10,171,994 B2* | 1/2019 | Kim | G06F 21/10 |
| 10,511,436 B1* | 12/2019 | Machani | H04L 9/30 |
| 2002/0013898 A1* | 1/2002 | Sudia | G06Q 20/02 |
| | | | 713/155 |
| 2010/0037055 A1* | 2/2010 | Fazio | H04L 9/3255 |
| | | | 713/171 |
| 2011/0107101 A1 | 5/2011 | Funk | |
| 2011/0138475 A1* | 6/2011 | Gordon | H04L 9/085 |
| | | | 726/26 |
| 2016/0294562 A1 | 10/2016 | Oberheide et al. | |
| 2016/0359619 A1* | 12/2016 | Solow | H04L 9/085 |
| 2017/0124348 A1* | 5/2017 | Pourzandi | H04L 9/008 |
| 2017/0289153 A1* | 10/2017 | Raziel | H04L 63/0853 |
| 2017/0339163 A1* | 11/2017 | Alhothaily | H04L 63/108 |

OTHER PUBLICATIONS

Shoup V Ed-Preneel B (ED): "Practical threshold signature" Lecture notes in Computer Scinece, Springer, Berlin, DE vol. 1807, May 14, 2000 (May 14, 2000).

* cited by examiner

DISTRIBUTED AUTHENTICATION

BACKGROUND

User authentication is one technique used for protecting data and access to resources. Many authentication techniques rely on a credential associated with an identity to prevent unauthorized access these resources. To reduce the risk that the credential can be lost and/or compromised, some systems employ multi-factor approaches that rely on a physical device in possession of the user in addition to the credential.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with distributed authentication are described. When a user registers to use a resource, a public-private key pair may be generated for the user. The public key may be stored with an authenticating device, and the private key may be used to generate a number of shares. The shares may then be stored in devices associated with the user that are likely to be around the user when the user seeks to use the resource. These devices may be, for example, mobile devices (e.g., phones, tablets), personal computers, wearables (e.g., watches, fitness trackers), and other devices that the user carries with them. Other example devices may include devices detected from an environment in which the user is seeking to access the resource.

When the user attempts to access the resource, a challenge may be issued to devices near the user during the access attempt. The challenge may be, for example, a one-time use nonce. The devices may respond to the challenge by transmitting partial responses to a collector which will form the partial responses into a group response. The shares of the private key may be generated so that the group response authenticates the user when a threshold number of shares on devices have participated in forming the group response. By way of illustration, the shares may be designed so that participation of two of three devices will result in responding to a challenge with a group response that is equivalent to signing the challenge with the private key. The response may be generated despite the private key not being stored on any of the three devices or even being formed during the generation of the group response.

Authenticating a user in this manner may be simpler for users than memorizing a password or carrying around a specialized device for authenticating themselves. Additionally, as a quorum of devices is used for authentication, if the user inadvertently leaves one device at home or a device becomes corrupted, the user may still be able to access the resource as long as the user has access to a threshold number of participating devices. Further, even if one device becomes compromised or stolen, that one device may not be sufficient for an attacker to access the resource without compromising additional devices.

Figure 1:
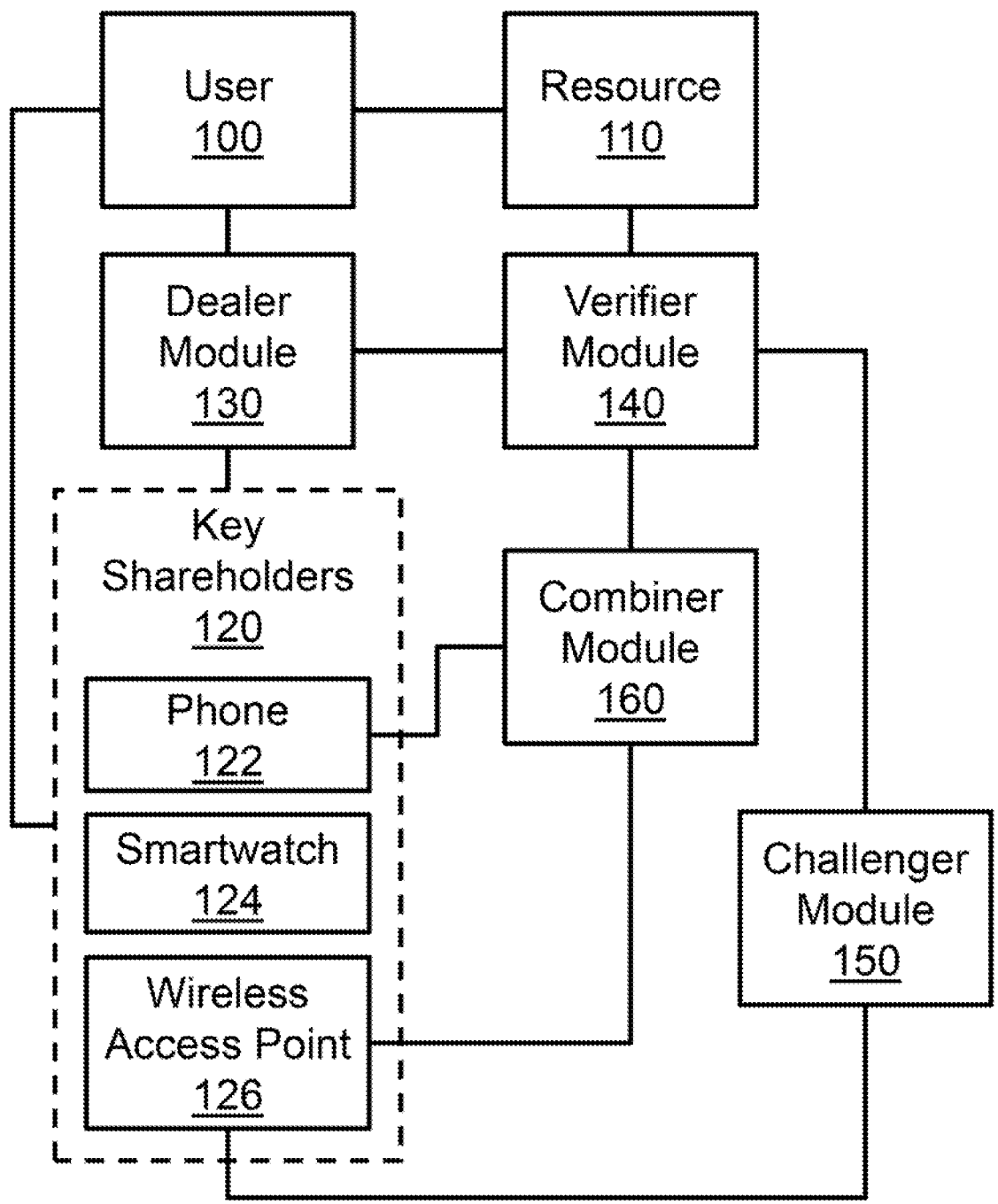
FIG. 1 illustrates example modules associated with distributed authentication.

FIG. 1 illustrates an example modules, devices, and entities associated with distributed authentication. It should be appreciated that the items depicted in FIG. 1 are illustrative examples, and many different systems, devices, and so forth, may operate in accordance with various examples.

FIG. 1 illustrates a user 100 and a resource 110. In various examples, user 100 would like to access resource 110, and an entity invested in the security of resource 110 may seek to prevent unauthorized accesses to resource 110. Consequently, an authentication technique may be employed to ensure that users 100 seeking to access resource 110 are who they say they are and that they are authorized to access resource 110. In various examples, resource 110 may be, for example, a device (e.g., a computer), a location, an application or service operating on a device, and so forth. In various examples, resource 110 may be remote or local to user 100.

In this example, the authentication technique used to provide access to resource 110 may rely on evidence provided from multiple sources that when combined, provide an adequate guarantee that user 100 is who they say they are. The evidence may take the form of a private key that has been divided into shares amongst a number of key shareholders 120. In this example, key shareholders 120 include a phone 122 and a smartwatch 124 which may be devices that user 100 is expected to have on their person when accessing resource 110. Key shareholders 120 also include a wireless access point 126, which may be related to a location at which user 100 is expected to access resource 110. Thus, key shareholders 120 may be devices expected to be carried by user 100, on the person of user 100, associated with user 100, or otherwise expected to be available to user 100 when user 100 attempts to access resource 110. These may be, for example, computers (e.g., laptops, desktops), mobile devices (e.g., phones, tablets, portable gaming systems), wearables (e.g., smartwatches, fitness trackers), security devices, and so forth. In other examples, the key shareholders 120 may be devices that indicate that user 100 is in and/or has access to location at which user 100 is expected to be accessing resource 110. These devices may include, for example, environmental devices, such as wireless routers, devices of belonging to users who regularly interact or are collocated with user 100, and so forth. Deciding which types of devices to use may depend on, for example, whether resource 110 is a device, location, application, or other resource type, where and/or how resource 110 is expected to be used, other attributes of resource 110, and which functionalities of various modules are designed to reside on a device in possession of user 100.

To distribute shares of the private key to key shareholders 120 user 100 may go through a registration process involving a dealer module 130. Thus, as a part of the registration process, key shareholders 120 may be identified by user 100 or other settings (e.g., security configurations dictated by an organization invested in the protection of resource 110) that user 100 expects or is expected to have available to them when accessing resource 110. Once key shareholders 120 have been identified to dealer module 130, dealer module 130 may be responsible for generating a public-private key pair, and distributing shares of the private key to key shareholders 120.

In one example, dealer module 130 may control generation of shares and a verifier module 140 may authenticate user 100 based on RSA public-private key cryptography, and Shoup's scheme (See: *Shoup V.* (2000) *Practical Threshold Signatures. In: Preneel B.* (eds) *Advances in Cryptology— EUROCRYPT* 2000), which are described herein. However, in other examples, share generation and user authentication may rely on alternative techniques. Thus, in one example, dealer module 130 may generate the public-private key pair by controlling a processer of a device on which dealer module 130 resides and/or which is executing dealer module 130 to select two large primes p and q, each having a predefined length exceeding a predefined value measured in bits (e.g., 3072). This processer may also select primes p and q so they have the property that p=2p'+1 and q=2q'+1 where p' and q' are also prime numbers. Dealer module 130 may then use as a public key for the public-private key pair, an RSA modulus n=pq and an exponent e that is selected such that e>1, where l is the number of shares that are going to be generated. Dealer module 130 may set the private key to be a value d such that de=1 mod(m), where m=p'q'. After generating the public-private key pair, the dealer module 130 may provide the public key to verifier module 140, which will eventually perform authentication of user 100.

Dealer module 130 may then use the private key to control generation, by the processor executing dealer module 130, of the l shares that will be distributed to key shareholders 120. Dealer module 130 may control generation of the shares so that an arbitrary group of k shares will authenticate user 100. This may be achieved by first generating a set [$\alpha_0$, $\alpha_1$, ..., $\alpha_{k-1}$] such that $\alpha_0$=d, and the remaining $\alpha_i$ are random integers between 0 and m. These numbers may be used to define a polynomial according to 1:

$$f(x)=\Sigma_{i=0}^{k-1}\alpha_i x^i \in \mathbb{Z}[x] \qquad 1.$$

This may allow dealer module 130 to control generation of shares $S_i$ for each of the l shares by the processor executing dealer module 130 according to 2:

$$S_i=f(i)(l!)^{-1} \bmod(m) \qquad 2.$$

The shares of form ($S_i$, i) may then be distributed by dealer module 130 to key shareholders 120. In some examples, shares may be distributed so that each key shareholder 120 is assigned a single share. In other examples, multiple shares may be given to a single key shareholder 120 to emphasize the value of that key shareholder 120 in authenticating user 100. By way of illustration, in the three key shareholder example illustrated in FIG. 1, phone 122 may be assigned two shares of four, while smartwatch 124 and wireless access point 126 may be assigned single shares. If three shares of the private key are mandated for authenticating user 100, then phone 122 in addition to at least one of smartwatch 124 and wireless access point 126 may need to be present for authenticating user 100.

In some examples, dealer module 130 may also generate verification values for each key shareholder 120. The verification values may be used by key shareholders 120 to authenticate themselves to a combiner module 160. Combiner module 160, may combines partial responses from key shareholders 120 into a group response to the challenge (a process that will be discussed in greater detail below). Consequently, combiner module 160 may use the verification values to ensure that values received from key shareholders 120 are only combined into the group response when they are received from real key shareholders 120, as combining an invalid partial response may make the group response invalid, rendering user 100 unable to authenticate themselves.

The verification values may be generated by the processor executing dealer module 130 first choosing a random $v \in \{\mathbb{Z}*_n\}^2$ and computing, for each i of the l shares, $v_i=v^{S_i} \in \{\mathbb{Z}*_n\}^2$. A value $u \in \mathbb{Z}*_n$ is chosen such that the Jacobi symbol (u|n)=−1, and the values v and u are used as the group verification key, and each value $v_i$ serves as the verification value for share i. Thus, when verification values are distributed, the dealer module 130 may control distribution of a share number i, share $S_i$, and verification value $v_i$ to key shareholders 120 for each share to be held by that key shareholder 120. Key shareholders 120 may also be transmitted the group verification key v and u to use in certain calculations described below.

In some examples dealer module 130 may seek to securely transmit shares, verification values, and so forth, to key shareholders 120. In some examples, this may be achieved using a secure connection protocol (e.g., Bluetooth). In other examples, the sensitive data may be secured during transmission by first exchanging public-private keys, and using the keys to encrypt and/or sign the sensitive data.

When user 100 seeks to authenticate themselves so that user 100 can access resource 110, verifier module 140 may generate a challenge to transmit key shareholders 120. In various examples, the challenge may be a nonce. A nonce may be a random value generated at the time the challenge is issued, and used solely for the present challenge. Thus, even in the unlikely event the nonce is randomly generated a second time, the repeated use of the nonce may be prevented to reduce the risk of a playback attack authenticating an unauthorized user. The challenge may be distributed to key shareholders 120 via a challenger module 150. Challenger module 150 may be, for example, verifier module 140, a component of a key shareholder 120, a third party device, and so forth. In various examples, it may be desirable for there to be some form of locality between one or more of resource 110, user 100, verifier module 140, challenger module 150, and/or key shareholders 120. Which entities should be local to one another may depend on the nature of resource 110, whether user 100 is local to resource 110 itself or to an access point of resource 110, and so forth. For example, when resource 110 is a desktop computer or certain other resource types that user 100 may directly access in person, resource 110 itself may perform functions of challenger module 150. In other examples, when user 100 accesses a resource 110 remotely, one of the key shareholders 120 may perform functions of challenger module 150.

Upon receiving the challenge, present key shareholders 120 may generate a partial response to the challenge. Partial responses may be generated by first creating a hash of challenge cha using, for example, SHA512. The example going forward assumes that the hash function SHA512 has been used, though other secure hash functions could also be used. Recalling that n and e refer to the modulus and exponent of the public key generated by dealer module 130, if the hash of cha is defined as $\hat{x}$, then x may be defined according to 3:

$$x = \begin{cases} \hat{x}, & \text{if } (\hat{x}|n) = 1 \\ \hat{x}u^e, & \text{if } (\hat{x}|n) = -1 \end{cases} \qquad 3$$

From this, the partial response of share i may be calculated by a processor implementing key shareholder 120 holding share i as $x_i = x^{2S_i} \bmod(n)$. When verification values are being used, the processor for this key shareholder 120 may also chose a random number $r \in \{0, \ldots, 2^{L(n)+2L_1}-1\}$, where L(n) is the bit length of n which in this case may be 3072, and $L_1$ is an RSA security parameter. The processor for this key shareholder 120 may then compute $c_i$=SHA512 $(v, x^4, v_i, x_i^2, v^r, x^{4r})$, and $z_i=s_ic_i+r$. The values $x_i$, $c_i$, and $z_i$ may be provided to combiner module 160. The processor of a device executing combiner module 160 may then verify that 4 holds true for these values to verify the authenticity of the partial response provided to the key shareholder 120 (though in alternative examples both key shareholder 120 and combiner module 160 could use hash functions other than SHA512):

$$c_i = SHA512(v, x^4, v_i, x_i^Z, v^{z_i}v_i^{-c_i}, x^{4z_i}x^{-2c_s}) \qquad 4.$$

Once the processor executing combiner module 160 has verified authenticity of partial response provided by participating key shareholders $i \in S=\{i_1, \ldots, i_k\}$, combiner module 160 may generate a group signature from these partial responses. To generate the group signature, the function according to 5 may be defined for each $i \in \{0, \ldots, l\} \backslash S$ and $j \in S$:

$$\lambda_{i,j}^s = (l!) \times \frac{\prod_{j' \in S \backslash \{j\}} (i - j')}{\prod_{j' \in S \backslash \{j\}} (j - j')} \in \mathbb{Z}. \qquad 5$$

Next, the processor executing combiner module 160 may compute w according to 6:

$$w = x_{i_1}^{2\lambda_{0,i_1}^s} \ldots x_{i_k}^{2\lambda_{0,i_k}^s}. \qquad 6$$

The value y is computed by the processor executing combiner module 160 such that $y=w^a x^b$ such that a and b are integers where 4a+eb=1. In some examples, a and b may be calculated using Euclid's algorithm. If $(\hat{x}|n)=1$ then y may be used as the group signature GroupSig. Otherwise if $(\hat{x}|n)=-1$, then $$\frac{y}{u}$$

may be used as the group signature GroupSig.

Once generated by the processor executing combiner module 160, the group signature may be transmitted by to verifier module 140. The processor of a device executing verifier module 140 may verify the group signature by checking that GroupSig$^e$=x mod n where n and e are the modulus and exponent portions of the public key generated by dealer module 130. If the group signature is verified, then verifier module 140 may grant user 100 access to resource 110. If the group signature is not verified, then user 100 may not have enough key shareholders 120 participating to authenticate user 100 to verifier module 140. Verifier module 140 at this point may, for example, prevent user 100 from accessing resource 110, demand further proof of user 100's identity (e.g., via a password), and/or take some other appropriate action consistent with maintaining the security of resource 110.

As mentioned above, certain entities illustrated in FIG. 1 may be combined and/or reside within one another. For example, it may be appropriate for one or more of dealer module 130, combiner module 160, and/or challenger module 150 to reside within a key shareholder 120 such as phone 122. In other examples, dealer module 130, verifier module 140, combiner module 160, and challenger module 150 may reside within a single system that communicates with key shareholders 120 when user 100 seeks to access resource 110. Thus, many of these modules may be local or remote to one or more of user 100, resource 110, key shareholders 120, and so forth.

In an alternative example, key shareholders 120 may be selected from a set of devices designed to indicate a quorum of multiple users 100. Thus, for example, each key shareholder 120 may be a mobile device belonging to a different user 100. When the number of users 100 and/or key shareholders 120 participating in an authentication attempt exceeds the threshold number of shares used to successfully authenticate, verifier module 140 may grant these users access to resource 110. One example situation where this may be desirable is to ensure that a board of trustees or executives has a mandated quorum to approve certain types of transactions.

In some examples, an update module (not shown) may also interact with various entities depicted in FIG. 1. The update module may facilitate adding shares to and/or removing shares from key shareholders 120, refreshing shares, and so forth. To add a share to a key shareholder 120, whether the key shareholder is new or old, in cases where there are unassigned shares, the update module may provision an unassigned key to this key shareholder. If there are no unassigned shares, the update module may control dealer module 130 to perform the provisioning process once again, and redistribute shares to key shareholders 120. Changing the number of shares used to authenticate user 100 may also be achieved by regenerating and distributing shares. Removing a key shareholder 120 may involve deprovisioning a verification value, or in cases where verification values are not used, regenerating and distributing shares. Updating shares may be achieved by regenerating and provisioning shares. In some of these examples, regenerating and provisioning shares may be achievable without updating the public key.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
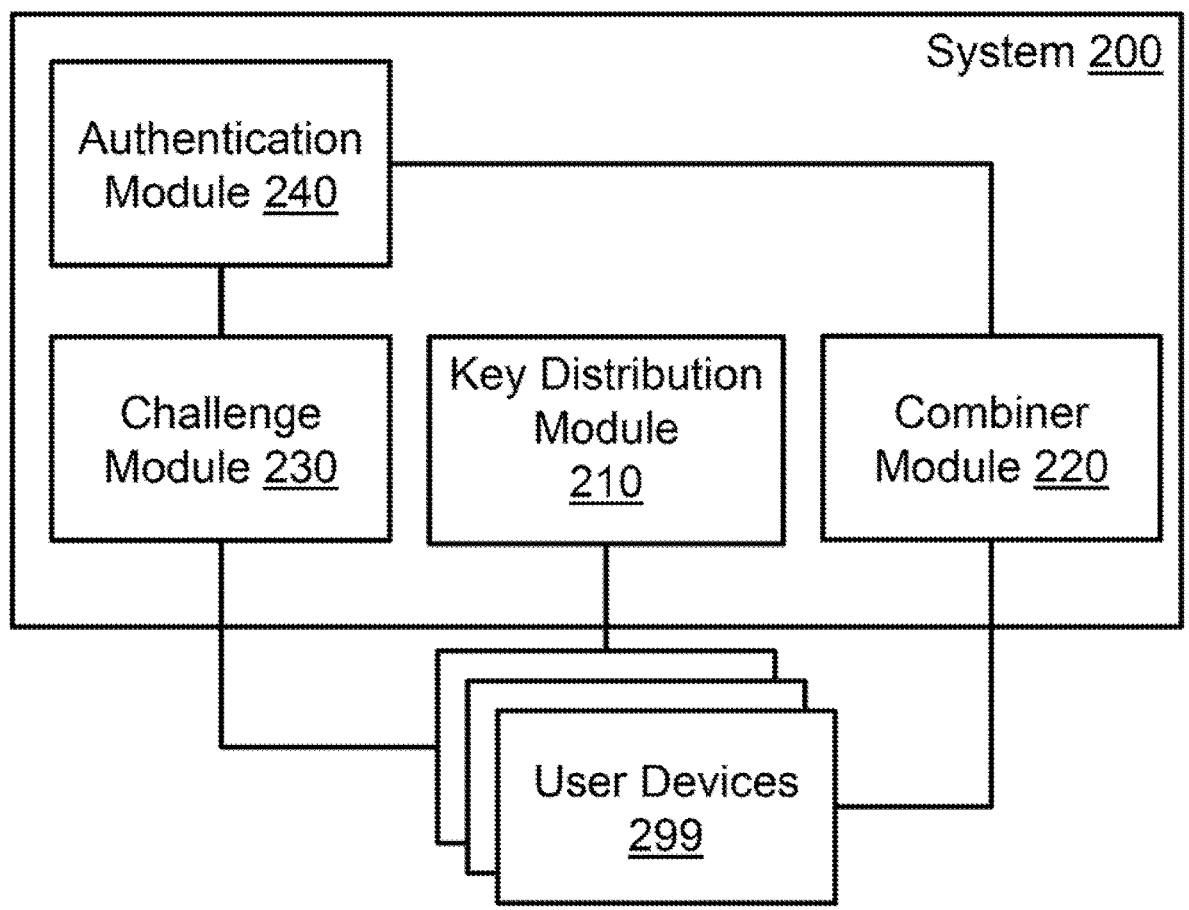
FIG. 2 illustrates an example system associated with distributed authentication.

FIG. 2 illustrates an example system 200 associated with distributed authentication. System 200 includes a key distribution module 210. Key distribution module 210 may generate a paired public key and private key. The paired public key and private key may be associated with a user. Key distribution module 210 may also provide or store the public key in a manner that makes the public key accessible to other aspects of system 200. Key distribution module 210 may also split the private key into a set of shares. Key distribution module 210 may also distribute members of the set of shares to a set of devices 299 associated with the user. In some examples, key distribution module 210 may generate more shares than there are devices 299. This may allow key distribution module to provide multiple shares to certain devices 299. This may make it so these devices 299 have greater weight when authenticating the user. In other examples, generating more shares than devices 299 may aid in provisioning a share to a new device 299 without having to create a new public key and/or private key.

Devices 299 may include, for example, mobile devices (e.g., cellular phone) belonging to the user, a laptop or other computer belonging to the user, a wearable (e.g., fitness tracker, smart watch) belonging to the user, a security device belonging to the user, a device belonging to another user, an environmental device, and so forth. Thus, in this context, when a device is said to be associated with the user, this implies that system 200 associates a presence of that device during an authentication attempt by the user as increasing the likelihood that the user is who they say they are. Consequently, the presence of an environmental device or a device of another user known to regularly interact with the user may be helpful when authenticating the user.

In various examples, key distribution module 210 may also establish a secure communication channel with user devices 299 when distributing shares to user devices 299. This may be achieved by, for example, using a secure communication technique (e.g., Bluetooth), exchanging public-private keys prior to transmitting shares, and so forth. Ensuring that keys are distributed securely may prevent interception of the keys and, consequently, authentication of an unauthorized person to system 200.

System 200 also includes an authentication module 240. Authentication module 240 may generate a challenge to authenticate the user. When authentication module 240 receives an authenticating response to the challenge, authentication module 240 may grant the user access to a resource. The resource may be, for example, a device (e.g., a desktop computer), a location (e.g., a building), a process or service running on a device, and so forth. In some examples, the challenge may be a nonce. The nonce may be a randomly generated data string that is used for a single authentication attempt. When the challenge is a nonce, the authenticating response may be a value generated by signing the nonce using the private key.

System 200 also includes a challenge module 230. Challenge module 230 may distribute the challenge generated by authentication module 230 to members of the set of devices 299 associated with the user.

System 200 also includes a combiner module 220. Combiner module 220 may receive partial responses from members of the set of user devices 299. Combiner module 220 may also combine the partial responses into a group signature, and provide the group signature to authentication module 240. The group signature may serve as an authenticating response to the challenge when generated from partial responses received from a threshold number of members of the set of devices 299. Thus, when a quorum of shares are participating, the group signature may authenticate the user, allowing access to the resource guarded by authentication module 240.

In some examples, key distribution module 210 may provide verification values to the members of the set of devices 299. The verification values may be used by devices 299 to authenticate themselves to combiner module 220. Thus, when receiving partial shares from user devices 299, combiner module 220 may check that the verification values match prior to combining partial shares into the group signature. In some examples, if a device submits a verification value that is invalid, combiner module may exclude partial share received from that device when generating the group signature. This may allow combiner module 220 to submit an authenticating response to authentication module 240 despite one or more user devices 299 becoming compromised.

In some examples, at least one of the challenge module 230, key distribution module 210, and combiner module 220 may reside within a member of the set of devices 299. Thus, in this example, these modules may operate as an application embedded in a user device 299. By way of illustration, a mobile device 299 may serve as key distribution module 210 and distribute keys to other user devices, and provide the public key to authentication module 240. When the user seeks to authenticate themselves, authentication module 240 may also transmit a challenge to the user's mobile device may serve as challenge module 230 by forwarding the challenge to other devices 299 on which shares are stored. The devices 299 may then respond with partial responses to the mobile device, which may also generate its own partial response using a share it kept for itself. The mobile device may then serve as combiner module 220, by combining the partial responses into the group signature and forwarding the group signature to authentication module 240.

In some examples, system 200 may include an update module not shown). The update module may control redistribution of secret shares to user devices 299. Redistribution of secret shares may facilitate, for example, adding a new user device to the set of devices 299, removing a removed device from the set of devices 299, changing the threshold number of devices needed for a valid authenticating response to be generating, updating the private key, and so forth. In various examples, the update module may control other aspects of system 200 to effect this redistribution of secret shares. By way of illustration, some of these redistributions may involve generating a new private and/or public key. Thus, the update module may control key distribution module 210 to generate a new private and public key and distribute shares of the private key to the user devices.

In other examples some redistributions may not involve generation of new keys. By way of illustration, removing a device from the set of user devices 299 may involve revoking that device's verification value so that combiner module refuses to combine partial shares received from that device. Adding a device without generating a new key may be achieved by generating an initial number of shares that exceeds the number of devices in the set of devices 299. Then, adding a new device to the set of user devices may involve assigning and providing an unassigned share to the new device.

Figure 3:
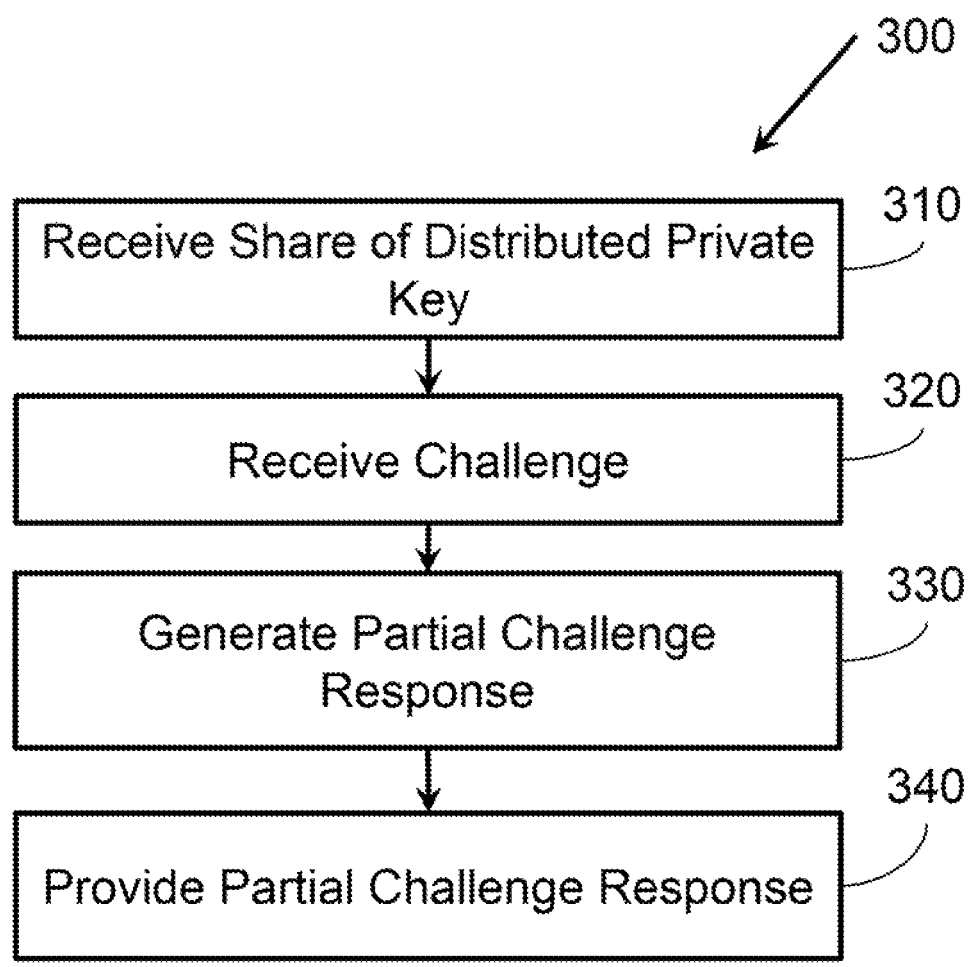
FIG. 3 illustrates a flowchart of example operations associated with distributed authentication.

FIG. 3 illustrates an example method 300. Method 300 may be embodied on a non-transitory processor-readable medium storing processor-executable instructions. The instructions, when executed by a processor, may cause the processor to perform method 300. In other examples, method 300 may exist within logic gates and/or RAM of an application specific integrated circuit (ASIC).

Method 300 may perform various tasks associated with distributed authentication. Method 300 may be performed by a user device. Method 300 includes receiving a share of a distributed private key at 310. The distributed private key may be received from a dealer device. The distributed private key may be paired with a public key used by an authentication device to authenticate a user. In one example, the dealer device may be the user device.

Method 300 also includes receiving a challenge at 320. The challenge may seek to authenticate the user. The challenge may be received from the authentication device via a challenge device. In some examples, the authentication device and the challenge device may be the same device. In other examples, the user device may be the challenge device.

Method 300 also includes generating a partial response to the challenge at 330. The partial response may be generated based on the challenge and on the share of the distributed private key.

Method 300 also includes providing the partial response at 340. The partial response may be provided to a combiner device. In some examples, the user device may be the combiner device. The combiner device may generate a complete response from a threshold number of partial responses. The partial responses may be received from a set of devices including the user device. The combiner device may transmit the complete response to the authentication device. The complete response may be a message that would be produced by signing the challenge with the private key. The complete response may be used by the authentication device to authenticate the user to grant the user access to a resource.

Figure 4:
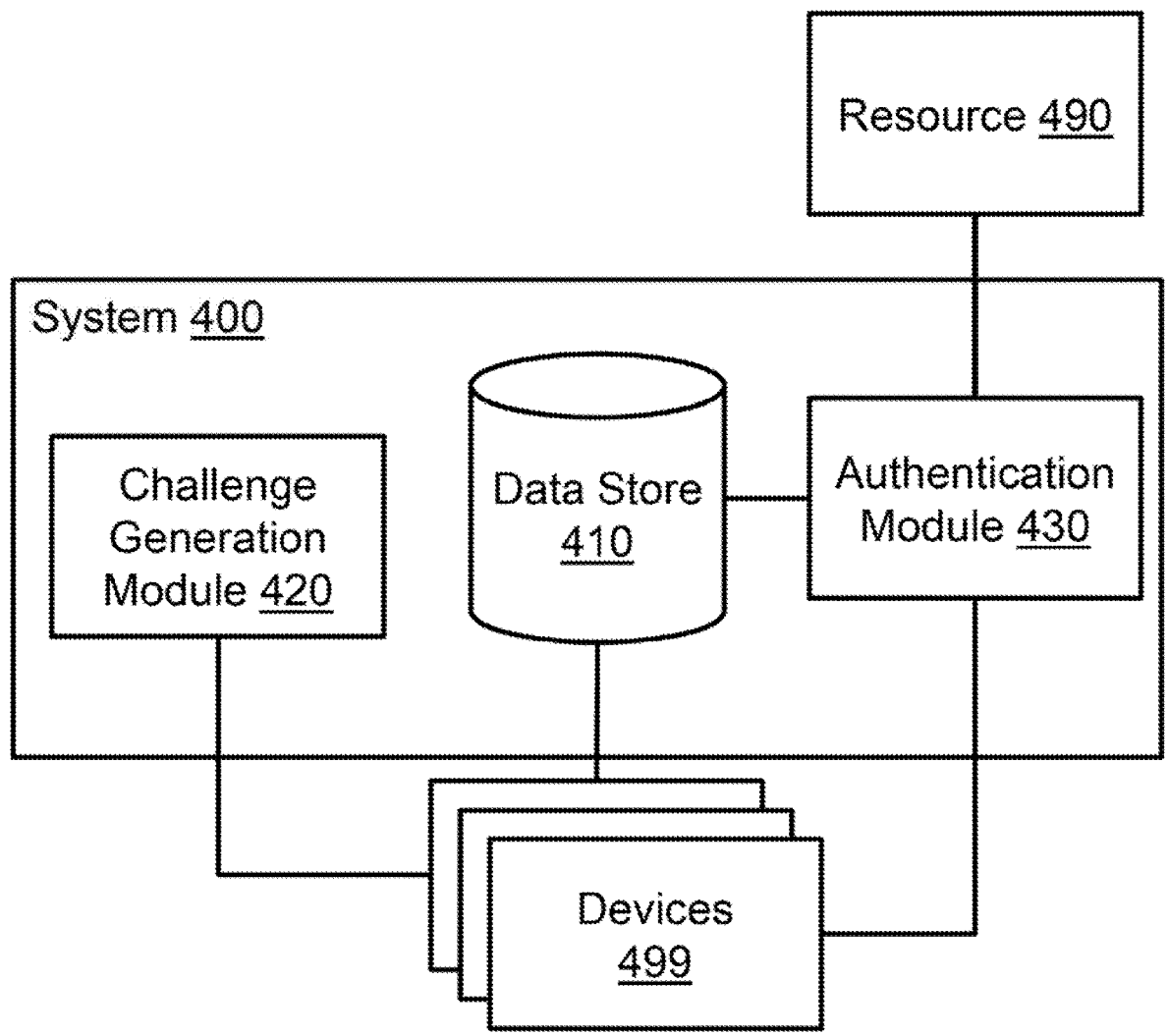
FIG. 4 illustrates another example system associated with distributed authentication.

FIG. 4 illustrates a system 400 associated with distributed authentication. System 400 includes a data store 410. Data store 410 may store a public key. The public key may be paired with a private key. The private key may be split into a set of shares. Members of the set of shares may be distributed amongst members of a set of devices 499.

System 400 also includes a challenge generation module 420. Challenge generation module 420 may issue an authenticating challenge to be distributed to members of the set of devices 499.

System 400 also includes an authentication module 430. Authentication module 430 may use the public key from data store 410 to grant access to a resource 490 upon receiving an authenticating response from the members of the set of devices 499. The authenticating response may be a response that would be generated by signing the authenticating challenge with the private key. The authenticating response may be generated by the cooperation of a quorum of the members of the set of devices using members of the set of shares stored on the quorum of devices.

In some examples, system 400 may include a key distribution module (not shown). The key distribution module may generate the public key, the private key, and split the private key into the set of shares. The key distribution module may also facilitate distribution of the keys.

In one example, the members of the set of devices may be devices belonging to members of a group. In this example, receiving the authenticating response may indicate participation of a quorum of the group. This may allow the group to ensure that a consensus has been reached or that there are enough members present to ensure that certain safeguards or requirements have been met.

Figure 5:
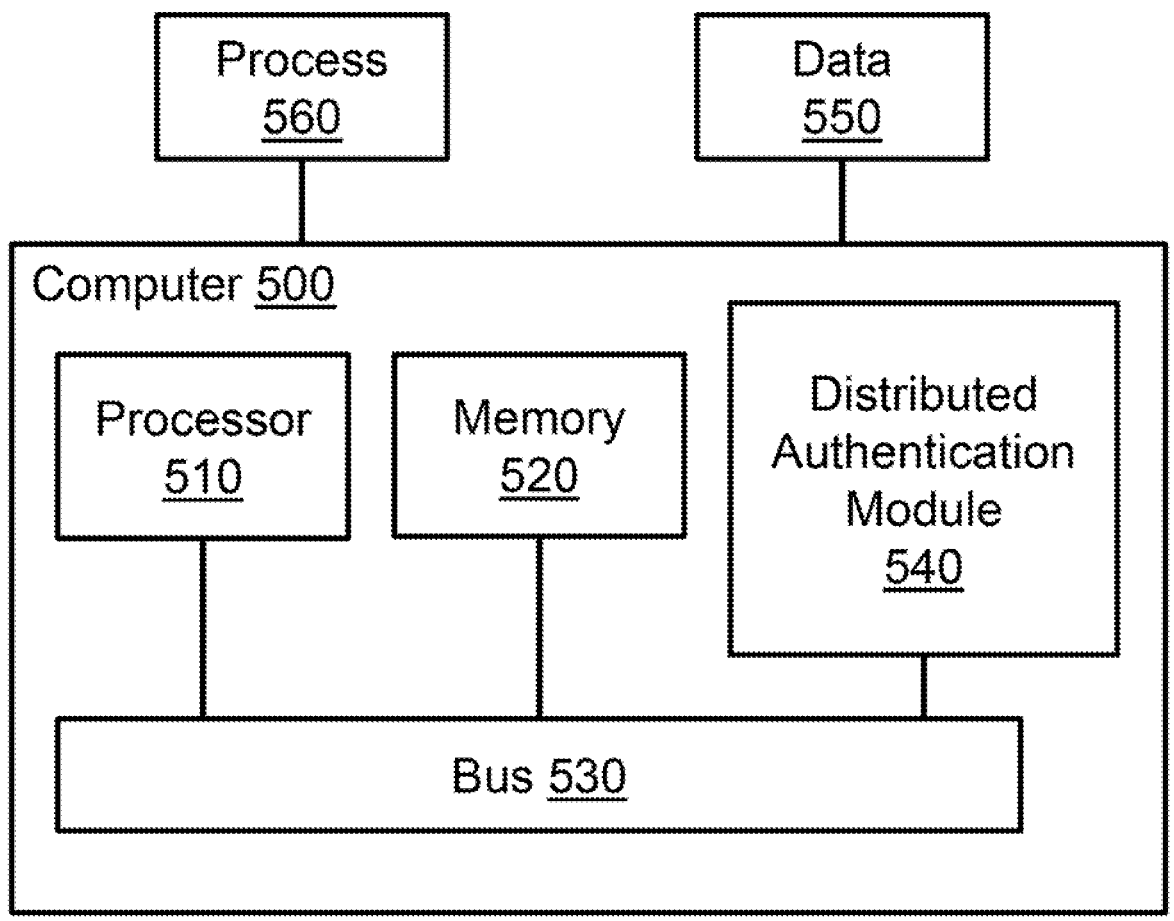
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes a distributed authentication module 540. Distributed authentication module 540 may perform, alone or in combination, various functions described above with reference to the example systems, methods, and so forth. In different examples, distributed authentication module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system, comprising:
a microprocessor;
a non-transitory machine-readable storage device that stores instructions that are executable by the microprocessor to:
operate a key distribution module to:
generate a paired public key and private key in association with a user, to split the private key into a set of shares, and
distribute members of the set of shares to a set of devices associated with the user, wherein:
a size of the set of shares is generated such that a number of members of the set of shares exceeds a number of members of the set of devices, and
a device of the set of devices associated with the user receives multiple members of the set of shares;
operate an authentication module to:
generate a challenge to authenticate the user, and
grant the user access to a resource upon receiving an authenticating response to the challenge;
operate a challenge module to:
distribute the challenge to members of the set of devices; and
operate a combiner module to:
receive partial responses from members of the set of devices, combine the partial responses into a group signature, and
provide the group signature to the authentication module, where:

each partial response corresponds to a member of the set of shares, and the group signature serves as an authenticating response to the challenge when generated from partial responses corresponding to a threshold number of shares.

2. The system of claim 1, where the instructions for the key distribution module, the challenge module, or the combiner module reside within a member of the set of devices.

3. The system of claim 1, where the challenge is a nonce, and where the authenticating response is a value generated by signing the nonce using the private key.

4. The system of claim 1, where the key distribution module provides verification values to the members of the set of devices, and where the combiner module verifies the identities of the devices using the verification values.

5. The system of claim 1, further comprising instructions that are executable by the microprocessor to operate an update module to control redistribution of secret shares to facilitate adding a new device to the set of devices, removing a removed device from the set of devices, changing the threshold number, or updating the private key.

6. The system of claim 5, where adding the new device to the set of devices involves assigning an unassigned member of the set of shares to the new device.

7. The system of claim 1, where the key distribution module establishes secure communication channels with respective members of the set of devices to provide the shares to the members of the set of devices.

8. The system of claim 1, where the set of devices includes a mobile device belonging to the user, a laptop belonging to the user, a wearable belonging to the user, a security device belonging to the user, a device belonging to another user, or an environmental device.

9. A method performed by a user device, the method comprising:

receiving, from a dealer device, multiple shares of a distributed private key, where the distributed private key is paired with a public key used by an authentication device to authenticate a user;

receiving, from the authentication device via a challenge device, a challenge seeking to authenticate the user;

generating multiple partial responses to the challenge based on the challenge and on the shares of the distributed private key; and providing the partial responses to a combiner device, wherein:

each partial response received by the combiner device corresponds to one of the shares of the distributed private key, the combiner device generates a complete response from a threshold number of partial responses received from a set of devices including the user device, a total number of members of a set of shares of the distributed private key is greater than a number of devices in in the set of devices, a device of the set of devices receives multiple members of the set of shares; and the combiner device transmits the complete response to the authentication device.

10. The method of claim 9, where one of the dealer device, the challenge device, and the combiner device are the user device.

11. The method of claim 9, where the complete response is a message that would be produced by signing the challenge with the distributed private key.

12. A system, comprising:

a microprocessor;

a non-transitory machine-readable storage device that stores instructions that are executable by the microprocessor to:

operate a data store to store a public key that is paired with a private key, where the private key has been split into a set of shares, and where members of the set of shares have been distributed to members of a set of devices, wherein:

a size of the set of shares is such that a number of members of the set of shares exceeds a number of members of the set of devices, and a one device of the set of devices receives multiple members of the set of shares;

operate a challenge generation module to issue an authenticating challenge to be distributed to members of the set of devices; and operate an authentication module to, based on the public key, grant access to a resource upon receiving an authenticating response from the members of the set of devices, wherein:

the authenticating response is a response that would be generated by signing the authenticating challenge with the private key, and the authenticating response is generated by the cooperation of a quorum of the members of the set of shares on the members of the set of devices.

13. The system of claim 12, comprising a key distribution module to generate the public key, the private key, and to split the private key into the set of shares.

* * * * *